TRANSISTOR MULTIVIBRATOR CIRCUIT INDEPENDENT OF SUPPLY VARIATIONS

Filed Aug. 30, 1963

INVENTOR
M. E. KROM
BY
S E Hollander
ATTORNEY

United States Patent Office 3,239,690

Patented Mar. 8, 1966

3,239,690

TRANSISTOR MULTIVIBRATOR CIRCUIT INDEPENDENT OF SUPPLY VARIATIONS

Myron E. Krom, Minerva Park, Ohio, assignor to Bell Telephone Laboratories, Incorporated, New York, N.Y., a corporation of New York Filed Aug. 30, 1963, Ser. No. 305,607

11 Claims. (Cl. 307—88.5)

This invention relates to timing circuits and more particularly to timing circuits for use in telephone offices wherein the supply potential may vary within a predetermined range.

It is often necessary in telephone practice to provide precise timing intervals for switching, metering, and other purposes. For example, in conventional practice it is necessary to provide, in each telephone office, precise timing arrangements for measuring the holding time of various circuits in order to effectuate their release after a predetermined holding time in the event that the telephone connection is for some reason not completed. As a specific illustration, in a No. 5 crossbar telephone office it is essential to release the marker circuitry after a predetermined delay if no originating registers are available to receive dial signals from a calling subscriber. Since the marker circuitry is a relatively complex equipment and, moreover, the "holding time" for the marker facilities may be measured in dollars per second, it is vital from an economic standpoint to release the marker within a carefully predetermined interval in order to preclude the additional expense attendant on protracted marker seizure. For all of these reasons, it is essential to provide timing facilities having a carefully defined tolerance of accuracy.

It is therefore an object of this invention to provide for the timing of accurate predetermined intervals.

Still another object of this invention is to provide a timing circuit of simple construction and sufficient flexibility to accurately measure a relatively wide range of predetermined intervals.

While timing circuits are universally needed in telephone work, a pervasive problem in telephone central office applications of timing circuits relates to the sensitivity of the timing circuit to variations in the potential of the office supply. Thus, those timing circuits which are predicated for proper operation on a constant supply potential, as many are, will suffer inaccuracies in view of the necessary voltage swings which occur in a telephone central office in consequence of load variations and other factors.

While it is possible to provide a relatively fixed supply potential to a timing circuit by means of a specialized regulator system designed for the specific application, the costs of such an arrangement may be economically prohibitive.

It is therefore an object of this invention to provide timing facilities for use in telephone offices which are relatively independent of usual variations in central office supply potential.

A further object of this invention is to provide for the timing of particular functions in a telephone central office wherein the circuit parameters of the timing facilities are not critically related to, or sensitive to central office battery supply potential.

Additional requirements in telephone office practice dictate the use of timing circuits, not only for "time-out" purposes wherein a single predetermined interval of time is metered but also necessitate periodic time measuring devices, such as those utilized in so-called "interrupter" circuits. An interrupter circuit in the telephone office is conventionally designed to supply a relatively constant frequency of pulses to a particular utilization circuit. As an illustration, in certain telephone practice it is desirable to supply a continuous series of timed pulses, e.g., at 30 pulses per minute, to an operator lamp circuit to apprise her that certain action is required, illustratively, a circuit disconnection.

Similarly, it is often necessary in telephone office practice to supply timed pulses of audible tone to either a calling party or an operator to indicate all trunks busy, called line busy, etc.

To satisfy this requirement, the equipment utilized in the past has included electromechanical relay interrupters, or rotary or motor driven interrupters using cam techniques to open and close the contacts thereof and the like. It is apparent that a static device, i.e., one having no moving parts which can satisfy the interrupter function, would be a desirable addition to the telephone plant. In the past, however, certain timing circuits which have been selected to perform this function, although completely useful and operative, have suffered the disadvantages adverted to above with respect to timing circuits, i.e., their critical dependency on the central office battery supply potential.

It is therefore an object of this invention to provide a transistor timing circuit adapted to supply a continuous series of timed impulses, the spacing between which is substantially independent of variations in central office supply battery potential.

These and other objects of the invention are achieved in one specific illustrative embodiment in which a free-running multivibrator is utilized to deliver output pulses at predetermined cyclical intervals. Each phase of operation of the multivibrator is controlled by a separate timing circuit which is adapted to respond to the energization of the multivibrator to a first condition to initiate a timed interval for driving the multivibrator to a second condition. In the latter condition a second timing circuit is energized to measure a predetermined interval before driving the multivibrator to its original condition to complete the cycle. Subsequent operations follow the same sequence of events.

Each of the timing circuits includes a two-stage transistor circuit in which the first stage is normally in the conducting condition and the second stage is normally in the OFF condition. A capacitor coupled to the first stage is charged to a potential approximately the supply potential. When the timing circuit is energized, a reference potential is applied to the capacitor in a manner which, in effect, doubles the effective voltage across the capacitor and back-biases a diode connected in shunt with the capacitor. At this time, the capacitor discharges through the first stage transistor for a time period depending on the parameters of the capacitor and a timing resistor in the discharge path. During this discharge time, the first stage transistor is maintained in the saturated condition and the second stage transistor remains in the nonconducting condition. When the capacitor voltage falls to a level slightly below the original voltage thereon, the diode becomes forward biased and abruptly cuts off the discharge current flow through the transistor. Thus, the first stage transistor is driven to the OFF condition and the second stage transistor responds by converting to the conducting condition to supply an output after the predetermined interval.

This completes one-half of the operating cycle of the multivibrator. The other half of the cycle is initiated at this time when a flip-flop circuit responsive to the first timing circuit shifts to the opposite condition and enables the other timing circuit. After the conclusion of the measured interval of the other timing circuit, the flip-flop is returned to its original condition to again enable the first timing circuit and the cyclical operation continues in this manner.

Since the timing interval in each instance is interrupted when the voltage across the capacitor is substantially one-half the original voltage thereacross, the time for capacitor discharge is rendered substantially immune to variations in the applied potential as will be explained herein in detail and, in consequence, each cycle of the multivibrator remains accurate despite normal variations in telephone office battery potential.

These and other objects and features of the invention may be more readily apprehended from an examination of the following specification, appended claims and attached drawing in which:

Figure 2:
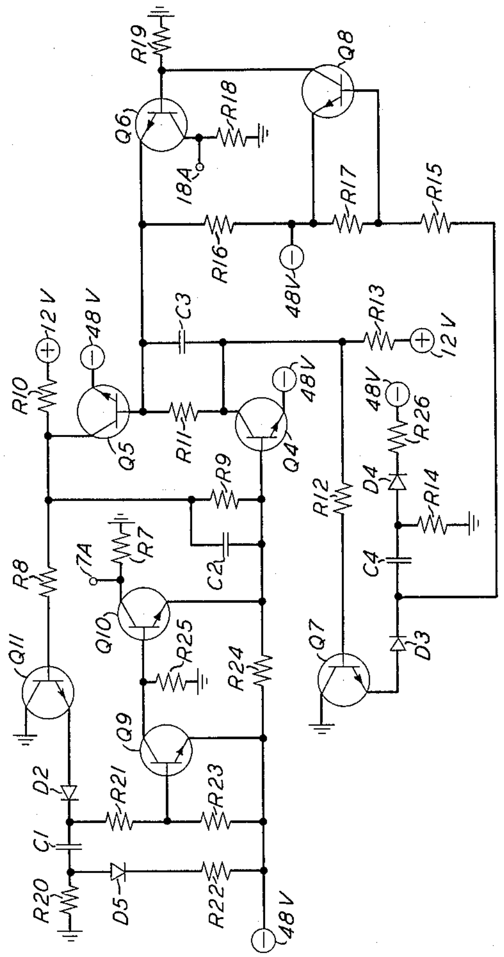
FIG. 2 shows a multivibrator circuit for generating a series of impulses with predetermined spacing.
Figure 1:
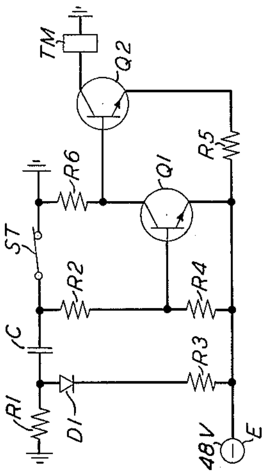
FIG. 1 shows a timing circuit for use in metering predetermined intervals.

Referring now to FIG. 1, the understanding of which will assist in the comprehension of the timing aspects of FIG. 2, it is seen that relay TM is ordinarily de-energized when the contacts of symbolic switch ST are closed. Under these conditions a path may be traced for the energization of transistor Q1 from ground, switch ST, resistance R2, base of transistor Q1, emitter of transistor Q1 to negative battery. As a result, transistor Q1 is forward biased and conducts. The collector electrode of transistor Q1 is substantially at battery potential from negative battery E to reverse-bias transistor Q2 and prevent relay TM from operating.

When switch ST is opened, ground potential is removed from the right-hand electrode of capacitor C and, in consequence, the electrode changes in potential to that of the negative battery minus a relatively small potential drop across the base-emitter path of transistor Q1 and resistance R2, the resistance of which is small compared to resistance R1. The left-hand electrode of capacitor C is changed in potential to essentially twice the negative battery potential. Diode D1 therefore has a potential of substantially 96 volts (assuming E is 48 volts) at the anode thereof and has battery potential at the cathode thereof which combination back-biases diode D1 and prevents current flow therethrough.

Capacitor C discharges at this time over a path from ground, resistance R1, capacitor C, resistance R2, base-emitter path of transistor Q1 to negative battery. This discharge continues until the left-hand electrode of capacitor C reaches a potential which is slightly more positive than the battery potential applied to the cathode. At this time diode D1 is forward biased and diverts any further discharge current from passing through transistor Q1. However, at this time there remains on capacitor C a voltage charge equal to the product of the current at cutoff, and the combined resistance of R2 and the base-emitter resistance of transistor Q1. Transistor Q1 therefore remains briefly conducting (for a relatively small period compared to the time T of Formula 1, infra) while the capacitor discharges over the path including resistor R1 until the cutoff voltage is reached. At that time transistor Q1 is cut off and the collector potential thereof rises substantially to ground potential to forward-bias transistor Q2 and permit relay TM to operate.

Since diode D1 is rendered conducting at a potential which is slightly more positive than the battery potential, it will be seen from the relationships detailed herein that the discharge time of the circuit including resistance R1 and capacitor C is substantially independent of the applied voltage. This may be seen if it is assumed that the voltage drop across diode D1 and transistor Q1 are represented by E1 and E2, respectively. Moreover, if it is assumed that the inverse impedance of diode D1 is infinite, the initial capacitor voltage is equal to E–E1.

The discharge current I at any instant has the value:

$$I=Io\ e^{-T/RC}$$

where $Io$ is the initial current

Whence $$e^{T/RC}=\frac{I_0}{I}=\frac{E-E1+E-E2}{R1+R2}\Big/\frac{E}{R1}$$

at cutoff $$=\frac{2E-E1-E2}{E}\times\frac{R1}{R1+R2}$$

and $$\log e^{T/RC}=\log\left[\frac{2E-E1E2}{E}\times\frac{R1}{R1+R2}\right]$$

$$T/RC\ \log_{10} e=\log_{10}\left[\frac{2E-E1-E2}{E}\times\frac{R1}{R1+R2}\right]$$

$$T=2.303\ RC\ \log\left[\frac{2E-E1-E2}{E}\times\frac{R1}{R1+R2}\right] \quad (1)$$

where $R=R1+R2$

If $$E>>E1+E2$$

and $$R1>>R2$$

Then $$T=2.303\ RC\times\log 2$$
$$=.691\ RC \quad (2)$$

Thus, the time at which diode D1 is rendered conducting is a function of only the circuit parameters and not the applied voltage.

The potential remaining on the capacitor at cutoff is equal to $(E2+IR2)$ where I equals the current at cutoff. When this potential decreases to a point where transistor Q1 falls out of saturation, transistor Q2 conducts and relay TM operates.

To insure that transistor Q1 remains saturated until cutoff, the value of resistance R1 should not exceed:

$$\frac{E-(E2+IR2)}{I}$$

where $I$=saturation current for transistor Q1 plus the current in resistor R4.

As an example, the parameters of FIG. 1 may take the following illustrative values:

| | |
|---|---|
| Resistor R1 | 430,000 ohms. |
| Resistor R2 | 3,000 ohms. |
| Resistor R3 | 500 ohms. |
| Resistor R4 | 68,000 ohms. |
| Resistor R5 | 200 ohms. |
| Resistor R6 | 30,000 ohms. |
| Capacitor C | 0.25 mf. |
| Transistor Q1 | W.E. 16A |
| Transistor Q2 | W.E. 16A |
| Diode D1 | W.E. 420G. |

Referring now to FIG. 2, it is seen that a transistor multivibrator circuit utilizing two timing circuits and a flip-flop circuit are incorporated in an arrangement which provides repeated or continuous output pulses at predetermined intervals.

In FIG. 2, resistors R7 and R18 represent the output or load resistors at which periodic impulses are delivered. Thus, terminals 7A and 18A repeatedly and at appropriate intervals exhibit potentials thereon in accordance with the "interrupter" type action of this circuit.

Initially, it will be assumed that the first timing circuit including transistors Q9 and Q10 is in the active or timing state and the second timing circuit including transistors Q6 and Q8 is in the quiescent condition. With transistor Q11 cut off, a –48 volt potential appears at the emitter thereof and the potential at the right-hand electrode of capacitor C1 is abruptly shifted from substantially –48 volts through transistor Q9 and resistance R21 to ground to –48 volts. In consequence, the voltage at the left-hand electrode of capacitor C1 is changed to substantially —96 volts. This follows since the capacitor was originally charged in a direction from ground at the right-hand electrode thereof and —48 volts at the left-hand electrode. When the ground condition is removed from the right-hand electrode of capacitor C1 (by the deenergization of transistor Q11, i.e., the active state of the first timing circuit) that electrode approaches —48 volts over a path including the emitter and base of transistor Q9 and resistor R21 as indicated above. Since the capacitor was already charged to a potential of —48 volts, the left-hand electrode thereof approaches a potential of —96 volts. In consequence, diode D5 is back-biased and capacitor C1 begins to discharge from ground, resistance R20, capacitor C1, resistance R21, base-emitter path of transistor Q9 to negative battery. During the time of discharge of capacitor C1, the voltage at the left-hand electrode thereof falls exponentially from —96 volts. When the voltage drops to a value slightly less than —48 volts, diode D5 is once more forward biased and thereafter shunts the discharge path of capacitor C1 and shortly thereafter effectively cuts off the discharge current at a point where the capacitor potential has fallen to substantially one-half the initial potential.

At this time, transistor Q9 cuts off and in doing so the collector potential of transistor Q9 rises to substantially ground potential and initiates the conduction of transistor Q10. The latter transistor saturates and applies a positive pulse to resistance R24 and the base of transistor Q4 in view of the excursion of the potential at the emitter electrode of transistor Q10 from a potential substantially approaching negative battery to a potential substantially approaching ground through resistor R7.

The positive pulse applied to the base of transistor Q4 drives that transistor into saturation and results in the de-energization of transistor Q5 in view of the negative potential appearing at the collector electrode of transistor Q4 which is applied to the base of transistor Q5. The potential at the collector electrode of transistor Q5 thus shifts from substantially —48 volts to substantially +12 volts through resistor R10. This potential is applied to the base of transistor Q11 which is rendered conducting to recycle the first timing circuit. Thus, the energization of transistor Q11 once more applies a ground potential to diode D2 and the right-hand electrode of capacitor C1 to energize transistor Q9 over a path from ground, collector-emitter junction of transistor Q11, diode D2, resistance R21, base-emitter path of transistor Q9 to negative battery. Capacitor C1 once more charges from ground, collector-emitter junction of transistor Q11, diode D2, capacitor C1, diode D5, resistance R22 to negative battery. Diode D5 also conducts from ground, resistance R20, diode D5, resistance R22 to negative battery.

Thus, an output pulse has been produced at terminal 7A and resistor R7 when transistor Q10 was driven into conduction and transistor Q9 was de-energized. Moreover, the negative potential now appearing at the collector electrode of transistor Q4 is applied over resistance R12 to the base electrode of transistor Q7 which is driven into nonconduction. In consequence, the voltage at the left-hand electrode of capacitor C4 which previously was at ground potential through transistor Q7 and diode D3 is now at a potential approaching —48 volts over resistance R15, base-emitter path of transistor Q8 to negative battery. Capacitor C4 was previously charged in a direction from ground at the left-hand electrode to substantially —48 volts at the right-hand electrode over a path from ground, collector-emitter path of transistor Q7, diode D3, capacitor C4, diode D4, resistance R26 to negative battery. When transistor Q7 is de-energized in the manner explained above, the left-hand electrode of capacitor C4 is abruptly shifted from ground to a voltage approaching negative battery. In consequence, the voltage at the right-hand electrode of capacitor C4 which previously was substantially —48 volts is now approximately —96 volts.

As a result, diode D4 now has a potential of —96 volts at the anode thereof and —48 volts at the cathode thereof and is back-biased. In the interim, capacitor C4 begins to discharge over a path from ground, resistance R14, capacitor C4, resistance R15, base-emitter path of transistor Q8 to negative battery. This procedure is continued until the voltage at the right-hand electrode of capacitor C4 falls slightly below negative battery (or the voltage at the cathode of diode D4). At this time, diode D4 is once more forward biased and shunts any further discharge current from capacitor C4. Shortly thereafter, when the remaining charge on the capacitor dissipates, transistor Q8 is driven into nonconduction and the collector potential thereof rises to substantially ground potential which in turn energizes transistor Q6, driving that transistor into saturation and producing an output pulse at terminal 18A and through resistor R18. The emitter electrode of transistor Q6, previously at a potential approaching negative battery, delivers a positive pulse to transistor Q5 which is once more rendered conducting and which in turn delivers a negative pulse over the collector electrode of transistor Q5 and resistor R9 to turn off transistor Q4. The latter transistor in turning off delivers a positive pulse over the collector electrode thereof to resistance R13 and the base of transistor Q7 over resistor R12. The energization of transistor Q7 permits capacitor C4 once more to charge over a path including ground, the collector-emitter junction of transistor Q7, diode D3, capacitor C4, diode D4, and resistance R26 to negative battery thereby recycling the second timing circuit. In the interim, the de-energization of transistor Q11 as a result of the energization of transistor Q5 once more initiates the entire cycle described above.

It will be noted that in each half of the timing cycle the capacitor discharge time is limited by the time required for the capacitors C1 and C4 to discharge to substantially a constant fraction (one-half) of the initially applied potential regardless of the potential initially applied.

As an example, the parameters of FIG. 2 may assume the following illustrative values:

| | |
|---|---|
| Resistor R7 | 10,000 ohms. |
| Resistor R8 | 2,000 ohms. |
| Resistor R9 | 56,000 ohms. |
| Resistor R10 | 10,000 ohms. |
| Resistor R11 | 56,000 ohms. |
| Resistor R12 | 2,000 ohms. |
| Resistor R13 | 10,000 ohms. |
| Resistor R14 | 430,000 ohms. |
| Resistor R15 | 3,000 ohms. |
| Resistor R16 | 4,300 ohms. |
| Resistor R17 | 68,000 ohms. |
| Resistor R18 | 10,000 ohms. |
| Resistor R19 | 30,000 ohms. |
| Resistor R20 | 430,000 ohms. |
| Resistor R21 | 3,000 ohms. |
| Resistor R22 | 500 ohms. |
| Resistor R23 | 68,000 ohms. |
| Resistor R24 | 4,300 ohms. |
| Resistor R25 | 30,000 ohms. |
| Capacitor C1 | 0.25 mf. |
| Capacitor C2 | .001 mf. |
| Capacitor C3 | .001 mf. |
| Capacitor C4 | 0.25 mf. |
| All transistors | W.E. 16A. |
| All diodes | W.E. 420G. |

It is to be understood that the above-described arrangements are illustrative of the application of the principles of the invention. Numerous other arrangements may be devised by those skilled in the art without departing from the spirit and scope of the invention.

What is claimed is:

1. A multivibrator circuit for generating predetermined time intervals substantially independent of supply potentials including first transistor timing means; second transistor timing means; bistable means coupled to said first and second transistor timing means; a potential source coupled to both said transistor timing means; each said transistor timing means including resistance means and capacitance delay means, and unidirectional conducting means for controlling the discharge of said capacitance means over a constant fraction of said potential source; and means in said bistable means responsive to the energization of said first transistor timing means to de-energize said first timing means and energize said second timing means.

2. In combination, a multivibrator circuit comprising first transistor timing means; second transistor timing means; bistable means coupling said transistor timing means; each said timing means including first and second transistors, a potential source connected to said transistors, capacitor means, unidirectional current conducting means for controlling the discharge of said capacitor means over a constant fraction of the applied potential for timing the interval of said timing means, means responsive to the discharge of said capacitor means to a predetermined potential to de-energize said first transistor and to energize said second transistor, means responsive to the energization of said second transistor for changing the state of said bistable means; and means responsive to the change in state of said bistable means for de-energizing said second transistor in said first transistor timing means and for initiating the discharging of said capacitor means in said second timing means.

3. A transistor multivibrator circuit including first transistor timing means; second transistor timing means; bistable means connected to said first and second transistor timing means; each said transistor timing means including first and second transistors, means for supplying operating potentials to said transistors, resistor and capacitance delay means coupled to said first transistor, and unidirectional current conducting means coupled to said capacitor means and to said potential means; means responsive to the transition of said bistable means to a particular state to initiate the discharging of said capacitor means in said first transistor timing means under control of said unidirectional current conducting means over a constant fraction of said potential means; additional means responsive to the discharging of said capacitor in said first transistor-timing means to a predetermined level to de-energize said first transistor and to energize said second transistor; means responsive to the energization of said second transistor in said first timing means for governing said bistable means to assume a second binary condition; and means responsive to the transfer of said bistable means to said second binary condition to de-energize said second transistor in said first timing means and to initiate the discharging of said capacitor in said second timing means.

4. A transistor timing circuit in accordance with claim 3 wherein said resistor means and capacitor means are serially connected and wherein said unidirectional current conducting means is coupled to the junction of said resistor and capacitor delay means and is also coupled to said supply potential means.

5. A transistor timing circuit including first and second transistor timing means; bistable means coupled to said first and second transistor timing means; means responsive to the completion of timing of a predetermined interval by said first transistor timing means for delivering a signal to transfer the condition of said bistable means; and additional means responsive to the transfer in condition of said bistable means to initiate a timing operation in said second transistor timing means and to restore said first transistor timing means to a normal condition; said first and second transistor timing means each including resistor-capacitor delay means, rectifier means coupled to said capacitor means, a source of operating potential coupled to said rectifier means, and means including said rectifier means and responsive to the transfer of said bistable means to a particular condition to govern the discharge of said capacitor means over a fraction of the potential of said potential source to render said timing intervals substantially independent of variations in operating potential.

6. A transistor timing circuit including first and second timing means for generating predetermined time intervals substantially independent of supply potentials, bistable means for controlling the operation of said first and second timing means; said first timing means including a first and second transistor, each of said transistors having collector, emitter and base electrodes, a source of operating potential and a source of reference potential connected to said emitter and collector electrodes, means for coupling the collector electrode of said first transistor to the base electrode of said second transistor, serially connected resistor-capacitor means, diode means coupling the junction of said resistor-capacitor means to said source of operating potential, and voltage divider means for coupling said capacitor means to said base electrode of said first transistor; means responsive to a transfer in state of said bistable means for delivering a signal to said capacitor means to initiate the discharging of said capacitor means under control of said diode means over a constant fraction of said source of operating potential; said first transistor being responsive to the discharging of said capacitor to a predetermined potential to energize said second transistor; and means responsive to the energization of said second transistor to drive said bistable means to a different state condition and to initiate a timing operation in said second timing means.

7. A multivibrator transistor timing circuit including first transistor timing means; second transistor timing means; each of said timing means including first and second transistors, a potential source coupled to said transistors, capacitor means connected to said transistors, unidirectional current conducting means coupled to said capacitor means, and means including said unidirectional means for controlling the discharge of said capacitor to time the interval of said timing means; and means responsive to the forward-biasing of said unidirectional current conducting means in response to the discharge of said capacitor means in said first timing means over a predetermined fraction of said source of potential for de-energizing said first transistor and energizing said second transistor in said first timing means and for initiating the discharge of said capacitor means in said second timing means.

8. A multivibrator transistor timing circuit in accordance with claim 7 wherein said means for initiating the discharge of said capacitor means in said second timing means includes bistable means coupling said first and second transistor timing means and responsive to the energization of said second transistor in said first timing means to effect the energization of said first transistor in said second timing means.

9. A multivibrator transistor timing circuit in accordance with claim 8 wherein said bistable means comprises first and second transistors, and means for interconnecting said transistors in feedback relationship to form a bistable circuit.

10. A multivibrator transistor timing circuit including first transistor timing means and second transistor timing means; each of said timing means including first and second transistors, a source of reference potential, resistor-capacitor means connected between said source of reference potential and said first transistor, a source of operating potential, and unidirectional current conducting means connecting said capacitor means to said source of operating potential, transistor switch means coupled between said source of reference potential and said first transistor, means responsive to the de-energization of said transistor switch means for initiating the discharge of said capacitor means through said first transistor and for reverse biasing said unidirectional means, means including said first transistor responsive to the discharge of said capacitor means to a fraction of said source of operating potential sufficient to forward bias said unidirectional means for de-energizing said first transistor and effecting the energization of said second transistor, and an output terminal coupled to said second transistor for indicating the completion of a timing interval and the energization of said second transistor; and bistable means coupling said first and second transistor timing means for controlling the enabling of said transistor timing means.

11. A multivibrator transistor timing circuit in accordance with claim 10 wherein said bistable means is coupled to each said transistor switch means and includes means effective upon the energization of each said second transistor to shift conduction in said bistable means and to re-energize said transistor switch means to recycle said timing means.

References Cited by the Examiner

UNITED STATES PATENTS

| | | | |
|---|---|---|---|
| 3,131,317 | 4/1964 | Seening Yee | 307—88.5 |
| 3,158,757 | 11/1964 | Rywak | 307—88.5 |

ARTHUR GAUSS, *Primary Examiner.*